United States Patent
Hosokawa et al.

(10) Patent No.: US 10,078,253 B2
(45) Date of Patent: Sep. 18, 2018

(54) OPTICAL MODULATOR

(71) Applicant: Sumitomo Osaka Cement Co., Ltd, Tokyo (JP)

(72) Inventors: Youichi Hosokawa, Tokyo (JP); Norikazu Miyazaki, Tokyo (JP); Kei Katou, Tokyo (JP)

(73) Assignee: SUMITOMO OSAKA CEMENT CO., LTD., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/515,614

(22) PCT Filed: Mar. 29, 2016

(86) PCT No.: PCT/JP2016/060267
§ 371 (c)(1),
(2) Date: Mar. 30, 2017

(87) PCT Pub. No.: WO2016/159020
PCT Pub. Date: Oct. 6, 2016

(65) Prior Publication Data
US 2018/0017839 A1 Jan. 18, 2018

(30) Foreign Application Priority Data

Mar. 31, 2015 (JP) .............................. 2015-074167

(51) Int. Cl.
 G02F 1/035 (2006.01)
 G02F 1/225 (2006.01)
 G02F 1/03 (2006.01)
 G02F 1/21 (2006.01)
(52) U.S. Cl.
 CPC .......... G02F 1/2255 (2013.01); G02F 1/0344 (2013.01); *G02F 2001/212* (2013.01)
(58) Field of Classification Search
 CPC ................................................... G02F 1/2255
 See application file for complete search history.

(56) References Cited

U.S. PATENT DOCUMENTS 7,095,926 B2 * 8/2006 Sugiyama ............. G02F 1/2255
　　　　　　　　　　　　　　　　　　　　　385/2
8,380,017 B2　2/2013 Sugiyama
　　　　　　　(Continued)

FOREIGN PATENT DOCUMENTS

JP　　2001004967 A　　1/2001
JP　　2002182172 A　　6/2002
(Continued)

OTHER PUBLICATIONS

International Search Report for PCT/JP2016/060267 dated Jul. 5, 2016.

*Primary Examiner* — Sung Pak
(74) *Attorney, Agent, or Firm* — Taft Stettinius & Hollister LLP (57) ABSTRACT

Provided is an optical modulator in which even in a case where an optical waveguide and a control electrode are highly integrated, a distortion due to stress acting on the optical waveguide from lead-out wiring of a signal electrode is mitigated and occurrence of a temperature drift or the like is suppressed. An optical modulator includes: a substrate 1 having an electro-optic effect; optical waveguides (L1 to L4), each of which is formed on the substrate and provided with at least one Mach-Zehnder type optical waveguide; and a control electrode which controls light waves propagating through the optical waveguides, in which the control electrode is configured of signal electrodes (S1 and S2) and ground electrodes (G1 to G3), each of the signal electrodes being provided with a pad part (S1P or S2P) for input or output, which is electrically connected to an electric circuit which is provided outside the substrate, an interaction part (indicated by arrow R1) which applies an electric field to the optical waveguide, and a lead-out wiring part which connects the pad part and the interaction part to each other, a portion of the lead-out wiring part is disposed parallel to an extended direction (a lateral direction in FIG. 3) of the (Continued)

Mach-Zehnder type optical waveguide within a range (indicated by arrow R2) in which two branching waveguides configuring the Mach-Zehnder type optical waveguide are present in the extended direction, and any one of a portion of the interaction part, another portion of the lead-out wiring part, and a stress relaxation structure of the ground electrode is formed at a position which is axially symmetrical to the portion of the lead-out wiring part with respect to a centro-symmetric axis in the extended direction of the Mach-Zehnder type optical waveguide.

5 Claims, 9 Drawing Sheets

(56) References Cited

U.S. PATENT DOCUMENTS

| | | | |
|---|---|---|---|
| 8,903,202 B1* | 12/2014 | Prosyk | G02F 1/225 385/2 |
| 9,008,469 B2* | 4/2015 | Prosyk | G02F 1/2257 385/14 |
| 2002/0186912 A1 | 12/2002 | Seino et al. | |
| 2004/0095628 A1 | 5/2004 | Seino et al. | |
| 2004/0151414 A1 | 8/2004 | Cheung et al. | |
| 2008/0044124 A1* | 2/2008 | Sugiyama | G02F 1/2255 385/3 |
| 2010/0329600 A1* | 12/2010 | Sugiyama | G02B 6/29352 385/2 |

FOREIGN PATENT DOCUMENTS

| | | |
|---|---|---|
| JP | 2009069616 A | 4/2009 |
| JP | 2009098640 A | 5/2009 |
| JP | 2009162933 A | 7/2009 |
| JP | 2010044197 A | 2/2010 |
| JP | 2011007972 A | 1/2011 |
| JP | 2011100168 A | 5/2011 |
| JP | 2014164272 A | 9/2014 |

* cited by examiner

OPTICAL MODULATOR

TECHNICAL FIELD

The present invention relates to an optical modulator and in particular, to an optical modulator having a substrate having an electro-optic effect, an optical waveguide which is formed on the substrate and provided with at least one Mach-Zehnder type optical waveguide, and a control electrode which controls light waves propagating through the optical waveguide.

BACKGROUND ART

In an optical communication technology or an optical measurement technology, an optical modulator in which an optical waveguide and a control electrode are incorporated into a substrate having an electro-optic effect is frequently used. In such an optical modulator, a Mach-Zehnder type optical waveguide is formed in the optical waveguide, and in the control electrode which controls light waves propagating through the optical waveguide, in a case where, for example, $LiNbO_3$ is used for the substrate, a signal electrode and a ground electrode is formed in a thickness of several tens of μm. In the optical modulator in which $LiNbO_3$ is used for the substrate, it is known that an operating point shift, a so-called temperature drift, which is caused by a temperature change, occurs.

In an optical modulator using a Mach-Zehnder type optical waveguide, for example, techniques of improving a temperature drift characteristic by taking the balance of stress affecting the optical waveguide due to a control electrode by securing the symmetry of cross section structure of the control electrode with respect to the optical waveguide are disclosed in Patent Literature Nos. 1 to 4 as well. Patent Literature No. 1 discloses a technique in which a signal electrode and a ground electrode facing it are formed substantially bilateral-symmetrically against the center between two of branching waveguides in a modulation region of a Mach-Zehnder type optical waveguide. Further, in order for the structure of a part of the ground electrode to be the same as the signal electrode, the thickness of the ground electrode is formed to be thinned at a specific region of the ground electrode.

Patent Literature No. 2 discloses a technique in which with respect to the thinned electrode of the specific region of the ground electrode of Patent Literature No. 1, a portion in which a conductor is lacked partially is formed, and thus the influence of stress of an outside part (the ground electrode which is present in a region away from an optical waveguide) of the ground electrode on the optical waveguide is suppressed. Further, Patent Literature No. 3 discloses a technique in which a part which is lack of a conductor partially is formed in each of two ground electrodes which put a signal electrode therebetween, so as to be symmetrical with respect to a center line of the signal electrode (a central conductor).

Further, Patent Literature No. 4 discloses a technique in which in a case where a plurality of Mach-Zehnder type optical waveguides are disposed in parallel, the structures of a signal electrode and a ground electrode are formed so as to be symmetrical with respect to not only the center between two branching optical waveguides configuring each Mach-Zehnder type optical waveguide but also the center between the Mach-Zehnder type optical waveguides adjacent to each other.

In a recent optical modulator, in order to meet market needs of larger-capacity and higher-speed in optical communication, a multi-level modulation format becomes to be used, and high-integration such as disposing a large number of Mach-Zehnder type optical waveguides in parallel is on-going, and an optical transmitter part which includes an optical modulator also requires a reduction in power dissipation or a down-sizing. Further, also in a transponder implemented a modulator, larger-capacity and higher-speed, a reduction in power dissipation, and a down-sizing are on-going, and in a drive circuit of an optical modulator, suppression of degradation of characteristics is required by simplification. For example, in the case of an optical modulator having a structure in which a RF modulation electrode part which superimposes signal components on each other and a DC electrode part which adjusts an operating point are combined, in order to protect a driver amplifier for driving the optical modulator from DC voltage, a DC block capacitor having a large withstand voltage is required in a front stage of the modulator. For this reason, an AC/DC separating electrode structure is desired in which the RF modulation electrode part and the DC electrode part are independently disposed and the DC block capacitor which is disposed in the front stage of the modulator is not required. In such a modulator, a control electrode or a wiring structure thereof is more complicated, and therefore, it has been getting difficult to be satisfied with symmetry of a cross section structure of an electrode against a waveguide in each Mach-Zehnder type optical waveguide. Further, stress imbalance due to an asymmetric structure causes different refractive-index changes in optical waveguides of arms of a Mach-Zehnder in accordance with a temperature change, and thus a phase difference is generated between the arms of the Mach-Zehnder, and as a result, an operating point shift, a so-called temperature drift phenomenon, is generated, whereby it becomes problematic.

In particular, in the AC/DC separating electrode structure, in order to suppress an increase in the size of the optical modulator itself, a longer DC electrode cannot be secured, and thus the Vπ voltage of a Mach-Zehnder structure becomes higher. Further, the temperature drift phenomenon occurring in one Mach-Zehnder structure is a sum of the temperature drift phenomena by the DC electrode and the RF modulation electrode superimpose, and therefore, the value of the DC voltage which is required to compensate for the operating point shift becomes larger, compared to a structure in which the RF modulation electrode and the DC electrode are combined. Furthermore, the operating point shift amount due to a DC drift phenomenon is proportional to the magnitude of the DC voltage which is applied, and therefore, in the AC/DC separating electrode structure, as described above, a large DC voltage is required for bias point compensation, and therefore, a large DC drift is induced, so that it makes difficult to assure a long term operation of an optical modulator. Due to these, it is indispensable to further suppress the operating point shift due to the temperature drift.

The inventors of the present invention have performed intensive studies with respect to a cause of the operating point shift based on the temperature drift phenomenon in a highly-integrated optical modulator. As a result, the inventors have found that if integration is required, as shown in FIG. 1, it is necessary to dispose a number of signal electrodes (S1 and S2), includes a RF modulation electrode or a DC electrode) on a substrate in which a plurality of Mach-Zehnder type optical waveguides (branching waveguides L1 to L4) are formed, and leading-out of the signal electrode is complicated, and due to a requirement of a down-sizing of an optical modulator, lead-out wiring of the signal electrodes has to be arranged close to the optical waveguides within a limited space, as shown in portions surrounded by frames a and b, for example, and stress acting on the optical waveguide becomes different between the optical waveguides, and therefore, it is one of the causes of the operating point shift based on the temperature drift phenomenon.

In particular, as the reason why a detour portion of the lead-out wiring of the signal electrode increases and the wiring is complicated, not only the integration of the Mach-Zehnder type optical waveguides (a nested optical waveguide or the like) but also making the electrical length of signal wiring from an electrical input pad part of each signal electrode to an interaction part of the Mach-Zehnder type optical waveguide be the same between the respective signal electrodes in order to match a so-called skew, or concentrating the electrical input pad parts on one of side faces of the substrate in the optical modulator, or the like can be given. Further, the width (in a direction perpendicular to a light propagation direction) of a chip of an optical modulator is limited, and therefore, the lead-out wirings being arranged to be integrated within a narrow space is also one of the reasons.

Figure 1:
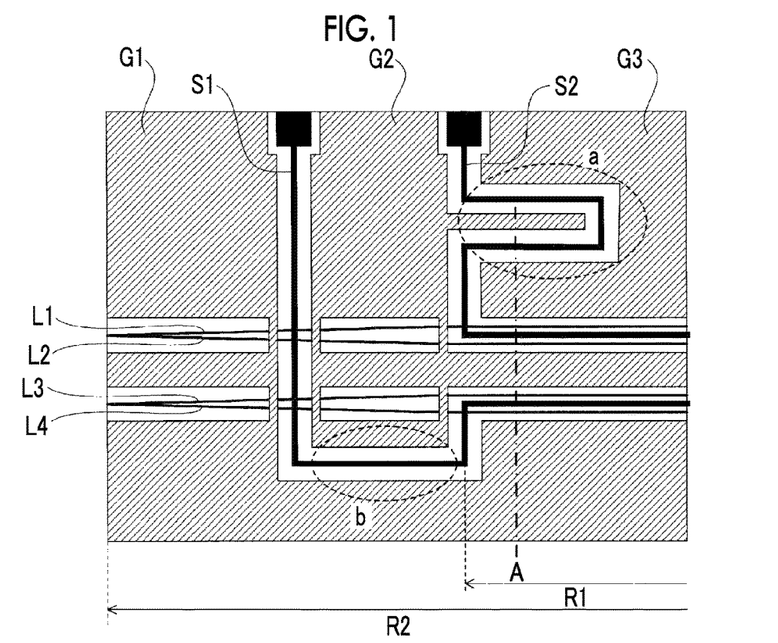
FIG. 1 is a plan view for describing an aspect of a control electrode in the vicinity of an input part of a RF modulation electrode in an optical modulator of the related art.
Figure 2:
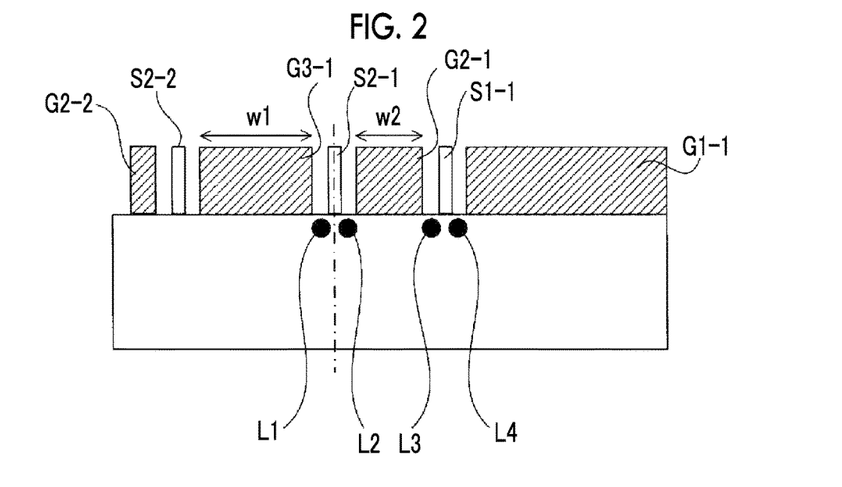
FIG. 2 is a cross-sectional view taken along a dot-and-dash line A of FIG. 1.

FIG. 1 shows a plan view of the vicinity of a RF modulation signal input part of an optical modulator, and FIG. 2 is a cross-sectional view taken along a dot-and-dash line A in FIG. 1. As shown in FIG. 2, in a case where the widths of ground electrodes (a width w2 of a ground electrode G2-1 and a width w1 of a ground electrode G3-1) on both sides of a signal electrode S2-1 acting on the optical waveguides L1 and L2 with the signal electrode S2-1 as the center (a dot-and-dash line) are different from each other (w1≠w2), the electrode dispositions with respect to the optical waveguides L1 and L2 become different from each other. In a case where a temperature is changed, a change of strain caused by stress to the substrate (LiNbO$_3$ or the like, also referred to as an LN substrate) is generated due to the expansion and contraction of a metal film configuring the electrode. However, in the case of FIG. 2, a change of strain with respect to each of the optical waveguides L1 and L2 becomes different due to the asymmetry of the electrode disposition, and the difference of strain induces a phase difference between the optical waveguides (L1 and L2). That is, a (temperature drift) phenomenon in which a bias point of the optical modulator changes occurs. In particular, if the electrode thickness is 10 μm or more, a strain due to stress which occurs becomes larger, and therefore, the influence becomes remarkable.

As a method of solving such problems, for example, a method of forming a recess portion (a thin portion of an electrode) at a position of the width w2 from the signal electrode S2-1 side on the ground electrode G3-1, as in Patent Literature No. 1, or a method of making the width of the ground electrode G3-1 be the same as the width w2 of the ground electrode G2-1, as in Patent Literature No. 4, is conceivable. However, in the former method, even if a structure of the ground electrode is adjusted, lead-out wiring S2-2 is present in the vicinity thereof, and therefore, a configuration of suppressing a strain due to stress corresponding to the lead-out wiring is further required, and it becomes a reason to make the electrode structure further complicated. Further, in the latter method, in a case where the width of the ground electrode G3-1 is set to be narrow so as to be equal to w2, the lead-out wiring (a portion a of FIG. 1) comes closer to the optical waveguide, and thus the influence of a strain due to stress which is applied by the lead-out wiring becomes larger.

Moreover, the lead-out wiring which is disposed close to the optical waveguide is present in not only the vicinity of a region of an interaction part between the signal electrode and the optical waveguide (indicated by an arrow R1 of FIG. 1) but also a region except for the region of the interaction part, as shown in the frame b, and it is indispensable to take into account the influence of the lead-out wiring in the entire region in which the branching waveguides of the Mach-Zehnder type optical waveguide are formed (indicated by an arrow R2 of FIG. 1).

CITATION LIST

Patent Literature

[Patent Literature No. 1] Japanese Laid-open Patent Publication No. 2001-4967
[Patent Literature No. 2] Japanese Laid-open Patent Publication No. 2009-69616
[Patent Literature No. 3] Japanese Laid-open Patent Publication No. 2009-98640
[Patent Literature No. 4] Japanese Laid-open Patent Publication No. 2011-100168

SUMMARY OF INVENTION

Technical Problem

An object of the present invention is to solve the problems as described above and provide an optical modulator in which even in a case where an optical waveguide and a control electrode are small and are highly integrated, occurrence of a temperature drift or the like which is caused by a strain due to stress acting on the optical waveguide from lead-out wiring of a signal electrode is suppressed.

Solution to Problem

In order to solve the above problems, an optical modulator according to the present invention has the following technical features.

(1) An optical modulator includes: a substrate having an electro-optic effect; an optical waveguide which is formed on the substrate and provided with at least one Mach-Zehnder type optical waveguide; and a control electrode which controls light waves propagating through the optical waveguide, in which the control electrode is configured of a signal electrode and a ground electrode, the signal electrode being provided with a pad part for input or output, which is electrically connected to an electric circuit which is provided outside the substrate, an interaction part which applies an electric field to the optical waveguide, and a lead-out wiring part which connects the pad part and the interaction part to each other, a portion of the lead-out wiring part is disposed parallel to an extended direction of the Mach-Zehnder type optical waveguide within a range in which two branching waveguides configuring the Mach-Zehnder type optical waveguide are present in the extended direction, and any one of a portion of the interaction part, another portion of the lead-out wiring part, and a stress relaxation structure of the ground electrode is formed at a position which is axially symmetrical to the portion of the lead-out wiring part with respect to a centrosymmetric axis in the extended direction of the Mach-Zehnder type optical waveguide.

(2) In the optical modulator according to the above (1), a range in which a structure of the control electrode is symmetrical with respect to the centrosymmetric axis is a range of 70 μm or more from the centrosymmetric axis.

(3) In the optical modulator according to the above (1) or (2), in the optical waveguide, a second Mach-Zehnder type optical waveguide is formed in each of two branching waveguides of a first Mach-Zehnder type optical waveguide, and any one of a portion of the interaction part, another portion of the lead-out wiring part, and a stress relaxation structure of the ground electrode is formed at a position which is axially symmetrical to the portion of the lead-out wiring part with respect to either or both of a centrosymmetric axis in an extended direction of the first Mach-Zehnder type optical waveguide and a centrosymmetric axis in an extended direction of the second Mach-Zehnder type optical waveguide.

(4) In the optical modulator according to the above (1) or (2), in the optical waveguide, a second Mach-Zehnder type optical waveguide is formed in each of two branching waveguides of a first Mach-Zehnder type optical waveguide, a third Mach-Zehnder type optical waveguide is formed in each of two branching waveguides of each second Mach-Zehnder type optical waveguide, and any one of a portion of the interaction part, another portion of the lead-out wiring part, and a stress relaxation structure of the ground electrode is formed at a position which is axially symmetrical to the portion of the lead-out wiring part with respect to any one or all of a centrosymmetric axis in an extended direction of the first Mach-Zehnder type optical waveguide, a centrosymmetric axis in an extended direction of the second Mach-Zehnder type optical waveguide, and a centrosymmetric axis in an extended direction of the third Mach-Zehnder type optical waveguide.

Advantageous Effects of Invention

According to the present invention, in the optical modulator including a substrate having an electro-optic effect, an optical waveguide which is formed on the substrate and provided with at least one Mach-Zehnder type optical waveguide, and a control electrode which controls light waves propagating through the optical waveguide, the control electrode is configured of a signal electrode and a ground electrode, the signal electrode being provided with a pad part for input or output, which is electrically connected to an electric circuit which is provided outside the substrate, an interaction part which applies an electric field to the optical waveguide, and a lead-out wiring part which connects the pad part and the interaction part to each other, a portion of the lead-out wiring part is disposed parallel to an extended direction of the Mach-Zehnder type optical waveguide within a range in which two branching waveguides configuring the Mach-Zehnder type optical waveguide are present in the extended direction, and any one of a portion of the interaction part, another portion of the lead-out wiring part, and a stress relaxation structure of the ground electrode is formed at a position which is axially symmetrical to the portion of the lead-out wiring part with respect to a centrosymmetric axis in the extended direction of the Mach-Zehnder type optical waveguide. Therefore, it is possible to provide an optical modulator in which it is possible to compensate for occurrence of a strain due to stress acting on the optical waveguide from the lead-out wiring of the signal electrode so that an operating point shift such as a temperature drift is improved. Further, the temperature drift is suppressed, whereby a voltage value required for bias control is reduced, and as a result, it also becomes possible to reduce the operating point shift due to a DC drift phenomenon.

DESCRIPTION OF EMBODIMENTS

Hereinafter, an optical modulator according to the present invention will be described in detail by using preferred embodiments.

Figure 3:
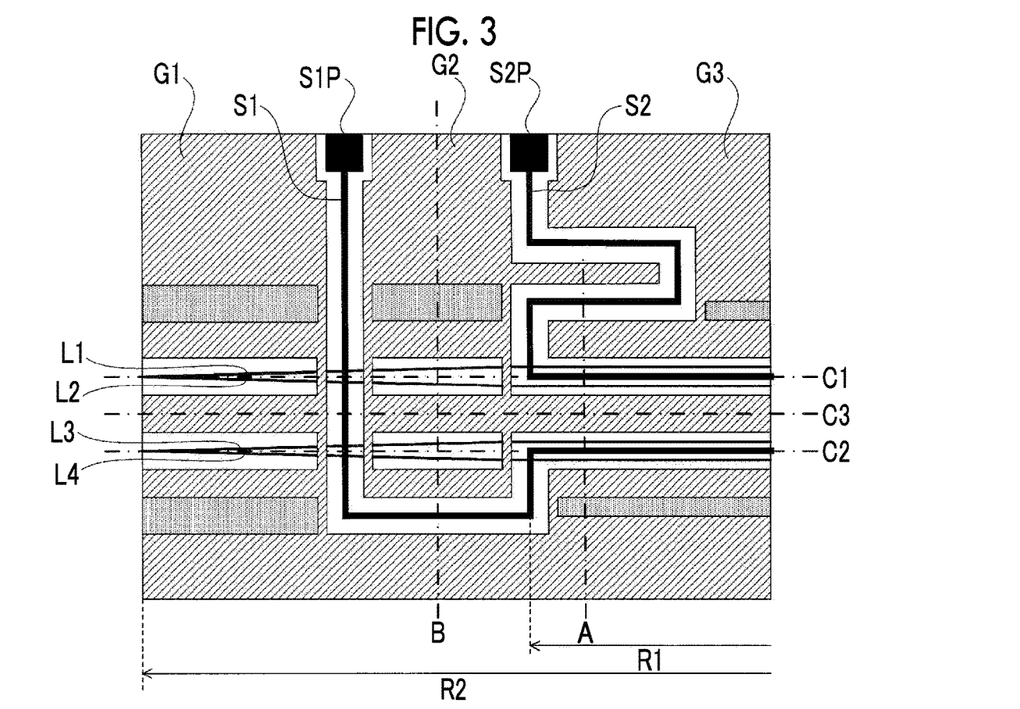
FIG. 3 is a plan view for describing a first example (the vicinity of an input part of a RF modulation electrode) relating to an optical modulator according to the present invention.

FIG. 3 is a plan view showing a first example of an optical modulator according to the present invention and is a diagram for describing the vicinity of an input part with respect to a control electrode which inputs a RF modulation signal. Further, FIG. 4 is a cross-sectional view taken along a dot-and-dash line A of FIG. 3, and FIG. 5 is a cross-sectional view taken along a dot-and-dash line B of FIG. 3.

Figure 4:
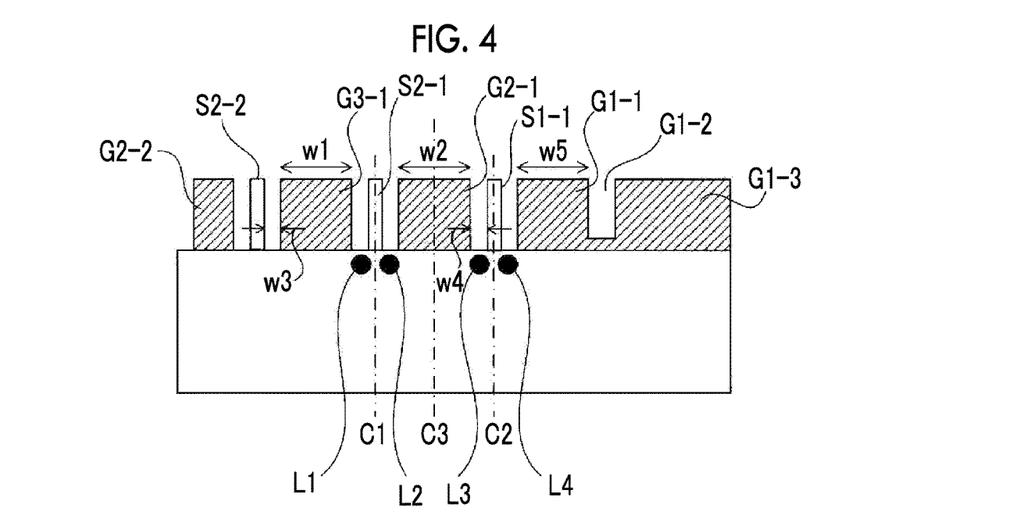
FIG. 4 is a cross-sectional view taken along a dot-and-dash line A of FIG. 3.
Figure 5:
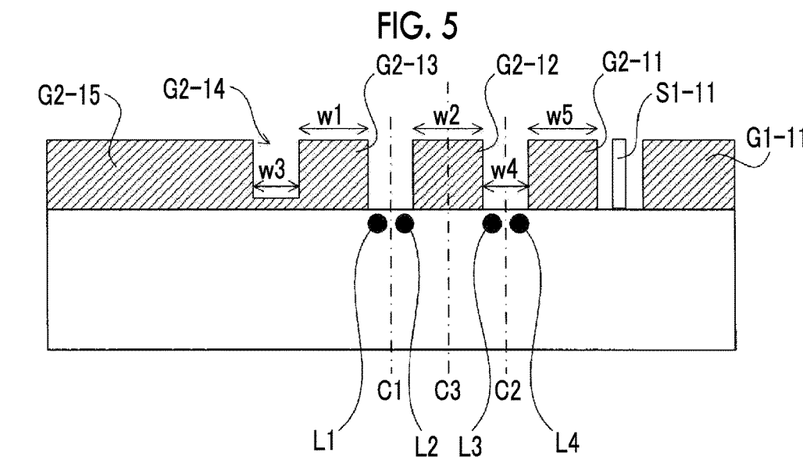
FIG. 5 is a cross-sectional view taken along a dot-and-dash line B of FIG. 3.

As shown in FIGS. 3 to 5, an optical modulator according to an aspect of the present invention includes: a substrate 1 having an electro-optic effect; optical waveguides (L1 to L4), each of which is formed on the substrate and provided with at least one Mach-Zehnder type optical waveguide; and a control electrode which controls light waves propagating through the optical waveguide, in which the control electrode is configured of signal electrodes (S1 and S2) and ground electrodes (G1 to G3), each of the signal electrodes being provided with a pad part (S1P or S2P) for input or output, which is electrically connected to an electric circuit which is provided outside the substrate, an interaction part (indicated by an arrow R1) which applies an electric field to the optical waveguide, and a lead-out wiring part which connects the pad part and the interaction part to each other, a portion (S1-11 or S2-2) of the lead-out wiring part is disposed parallel to an extended direction (a lateral direction in FIG. 3) of the Mach-Zehnder type optical waveguide within a range (indicated by an arrow R2) in which two branching waveguides configuring the Mach-Zehnder type optical waveguide are present in the extended direction, and any one of a portion (in a case where a portion of the lead-out wiring part is S2-2, S1-1 corresponds thereto) of the interaction part, another portion of the other lead-out wiring part, and a stress relaxation structure (in a case where a portion of the lead-out wiring part is S1-11, G2-14 corresponds thereto) of the ground electrode is formed at a position which is axially symmetrical to the portion of the lead-out wiring part with respect to a centrosymmetric axis in the extended direction of the Mach-Zehnder type optical waveguide.

In FIG. 3, branching waveguides L1 and L2 form one Mach-Zehnder type optical waveguide, and other branching waveguides L3 and L4 form another Mach-Zehnder type optical waveguide. The two Mach-Zehnder type optical waveguides shown in FIG. 3 are second Mach-Zehnder type optical waveguides respectively formed in two branching waveguides of one Mach-Zehnder type optical waveguide (a first Mach-Zehnder type optical waveguide) which is not shown in the drawing. The optical modulator according to the present invention is applicable if there is at least one Mach-Zehnder type optical waveguide.

In FIG. 3, a part in which a portion of a lead-out wiring part of the signal electrode S2 is parallel to the extended direction (the lateral direction in FIG. 3) of the Mach-Zehnder type optical waveguide is present in a range (a range indicated by the arrow R1) in which the interaction part (a part which applies an electric field to the optical waveguide) of the control electrode is formed in the extended direction of the Mach-Zehnder type optical waveguide. Further, on the left side of the range indicated by the arrow R1, the control electrode which applies an electric field to the optical waveguide is not formed. However, a part in which a portion of a lead-out wiring part of the signal electrode S1 is parallel to the extended direction is present in the vicinity of the optical waveguide. In a case where such a portion of the lead-out wiring part is present, a strain generates due to stress which is applied to the optical waveguide adjacent thereto, and therefore, in the optical modulator according to the present invention, a structure or layout of the control electrode is arranged such that in a temperature change, the operating point shift of a temperature drift phenomenon which is caused by a change of strain due to such stress is suppressed as much as possible.

Figure 6:
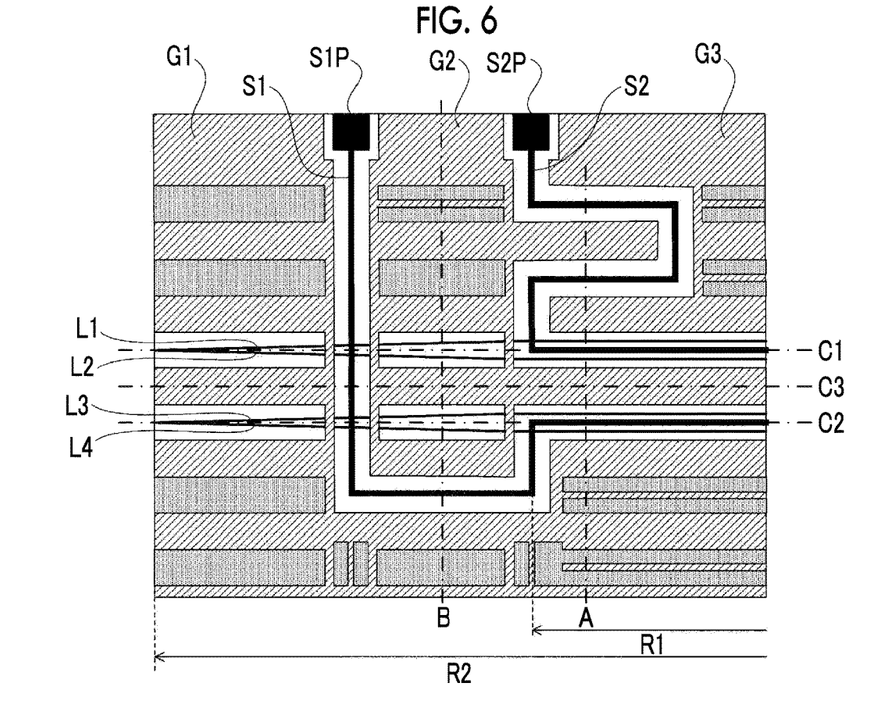
FIG. 6 is a plan view for describing a second example (the vicinity of the input part of the RF modulation electrode) relating to the optical modulator according to the present invention.

In order to compensate for a difference of strain due to stress between the optical waveguides, it is necessary to arrange the structure of the control electrode so as to be symmetrical with respect to the centrosymmetric axis (the axis of symmetry between the two branching waveguides) in the extended direction of the Mach-Zehnder type optical waveguide. In a case where there is a plurality of Mach-Zehnder type optical waveguides, the structure of the control electrode may be made symmetrically in each of the Mach-Zehnder type optical waveguides. Further, in the case of a so-called nested optical waveguide in which a second Mach-Zehnder type optical waveguide is incorporated into each of two branching waveguides of a first Mach-Zehnder type optical waveguide in a nest type, a configuration may be made so as to have the symmetry of the control electrode with respect to not only the centrosymmetric axes (C1 and C2) of the second Mach-Zehnder type optical waveguides but also the centrosymmetric axis (C3) of the first Mach-Zehnder type optical waveguide.

The "centrosymmetric axis" as referred to in the present invention coincides with an axis (each of C1 to C3) which passes through the center of the Mach-Zehnder type optical waveguide in a case of being viewed in a plan view as shown in FIG. 3. However, in a case of being viewed in a cross section in a direction perpendicular to the extended direction of the Mach-Zehnder type optical waveguide, as in FIGS. 4 and 5, it means an up-and-down direction of the drawing (a normal direction to the surface of the substrate 1), which passes through the axis (each of C1 to C3). In other words, the structure of the control electrode is formed symmetrically against a sagittal plane which passes through the central axis in the extended direction of the Mach-Zehnder type optical waveguide perpendicular to the surface of the substrate 1. Here, such a plane of symmetry is referred to as a "centrosymmetric axis".

As a configuration of compensating for a strain due to stress which is caused by a portion (S2-2) of the lead-out wiring part, as shown in FIG. 4, first, with respect to the centrosymmetric axis C1 between the Mach-Zehnder type optical waveguides (L1 and L2), the signal electrode S1-1 is disposed symmetrically to a portion S2-2 of the lead-out wiring part. According to this, a width w1 of a ground electrode G3-1 and a width w2 of a ground electrode G2-1 may be arranged to be the same. Further, a distance w3 between the ground electrode G3-1 and the lead-out wiring part (the signal electrode) S2-2 may also be arranged to be the same as a distance w4 between the ground electrode G2-1 and the signal electrode S1-1.

Next, with respect to the centrosymmetric axis C2 between the Mach-Zehnder type optical waveguides (L3 and L4), it is necessary to symmetrically form the structures of the ground electrode G2-1 and a ground electrode G1-1. For this reason, a slit part G1-2 is formed on the ground electrode G1-1 side. When forming the slit part, the width w2 of the ground electrode G2-1 and a width w5 of the ground electrode G1-1 may be set to be the same.

As the "stress relaxation structure of the ground electrode" in the present invention, in FIG. 4, a configuration in which the slit part G1-2 is formed corresponding to a signal electrode S2-1 is used. If it is possible to compensate for a strain due to stress which is applied to the optical waveguide on which attention is focused, there is no limitation to the slit part having such a shape. For example, similar to the signal electrode S2-1, it is also possible to provide the same protrusion-shaped portion as the signal electrode S2-1 between two slit parts. Further, it is also possible to form a single slit part having a width equivalent to the gap between the ground electrodes on both sides, which put the signal electrode S2-1 therebetween. It might as well secure conduction between the ground electrodes by arranging a thinner electrode having a thickness of 10 μm or less, more preferably, 5 μm or less, in the slit part. Instead of the slit part, it is also possible to provide a removed part in which a ground electrode is completely removed, as shown in Patent Literature Nos. 2 and 3.

Further, with regard to the centrosymmetric axis C3 of the first Mach-Zehnder type optical waveguide, the slit part G1-2 plays an important role with respect to the lead-out wiring part S2-2. For this reason, the width w1 of the ground electrode G3-1 and the width w5 of the ground electrode G1-1 are set to be the same, or the size of the width (in a right-and-left direction of the drawing) or the depth (in an up-and-down direction of the drawing) of the slit part G1-2 is arranged such that stress of the same extent as the stress which is generated by the lead-out wiring part S2-2 occurs.

In this way, the structure or layout of the control electrode is made to be symmetrical with respect to the centrosymmetric axes of all the Mach-Zehnder type optical waveguides, whereby it is possible to effectively suppress a strain due to stress.

In the optical modulator according to an aspect of the present invention, a place where a part in which a portion of the lead-out wiring part is parallel to the extended direction of the optical waveguide is present is not limited within the range of the interaction part (indicated by the arrow R1 of FIG. 3). The lead-out wiring part S1-11 is present even in a range (the left side of the arrow R1) in which there is no interaction part.

In the case of an optical modulator which does not have a buffer layer, if an electrode is directly formed on an optical waveguide, an optical loss occurs. However, in a place where lead-out wiring is disposed, a ground electrode is required in the vicinity of the lead-out wiring. In addition, as it is preferred that ground connection is a strong grounding ideally, as in FIG. 3, ground electrodes are disposed at almost all places except for the places where the optical waveguides (L1 to L4) and the signal electrodes (S1 and S2) are disposed. For this reason, as shown in FIG. 5, ununiformed electrode patterns (G2-11, G2-12, and G2-13) are configured in the vicinity of the optical waveguides (L1 to L4).

Firstly, attention is focused on the centrosymmetric axis C2 of the Mach-Zehnder type optical waveguide closest to the lead-out wiring part S1-11. The ground electrode G2-11 has the width w5 due to the lead-out wiring part S1-11, and therefore, the width of the ground electrode G2-12 is arranged so as to have the same width. However, the optical waveguides L1 and L2 are formed at a position corresponding to the lead-out wiring part S1-11, and a ground electrode cannot be provided at the portion. For this reason, in a case where a strain due to stress caused by the lead-out wiring part S1-11 is also taken into account, it is also possible to make the width w2 of the ground electrode G2-12 slightly wider than the width w5 of the ground electrode G2-11. Further, it is also possible to compensate for a strain due to stress caused by the influence of the lead-out wiring part S1-11, by adjusting the gap between the ground electrodes G2-12 and G2-13.

With regard to the centrosymmetric axis C1 of the Mach-Zehnder type optical waveguide, a slit part G2-14 is formed in consideration of the width w2 of the ground electrode G2-12 and a gap w4 between the ground electrodes (the gap between G2-11 and G2-12). For example, the width w2 of the ground electrode G2-12 and the width w1 of the ground electrode G2-13 are made to be the same, or a width w3 of the slit part G2-14 is arranged in consideration of the gap w4 between the ground electrodes. It is also possible to make w3 be the same as w4. However, it is also possible to arrange w3 to be wider than w4 in consideration of the influence of a thin electrode.

Further, the centrosymmetric axis C3 of the first Mach-Zehnder type optical waveguide is considered. A portion corresponding to the lead-out wiring part S1-11 is the slit part G2-14, and the width w5 of the ground electrode G2-11 and a width w1 of the ground electrode G2-13, which determine their positions of disposing, and furthermore, the gap w3 of the slit part G2-14, are adjusted. In this way, the structure or layout of the control electrode is made to be symmetrical with respect to the centrosymmetric axes of all the Mach-Zehnder type optical waveguides, whereby it is possible to effectively compensate for a strain due to stress. Further, as compared to the case of FIG. 4, in FIG. 5, although the symmetry is slightly inferior, with respect to a structure in the vicinity of the optical waveguide, in which the degree of influence is high, excellent symmetry is secured. Therefore, there is an effect of suppressing a temperature drift.

Figure 7:
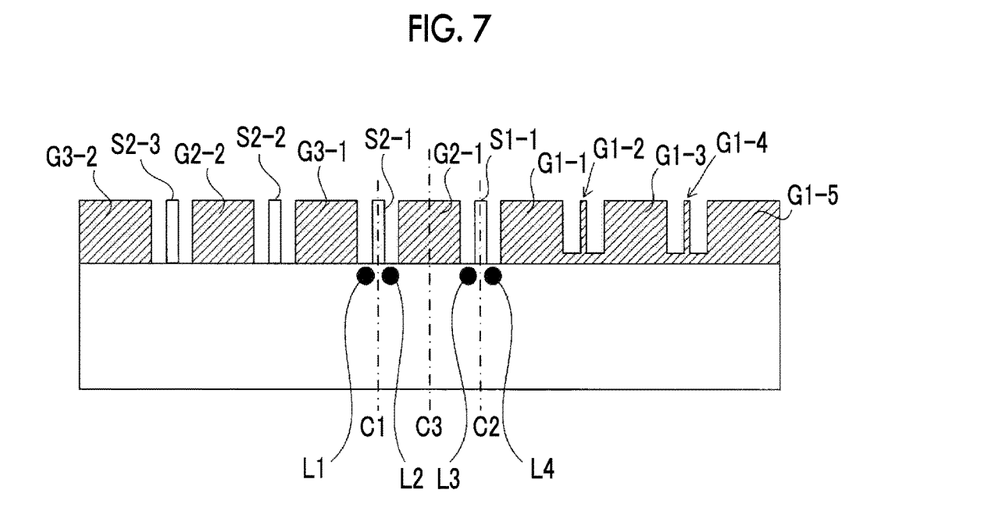
FIG. 7 is a cross-sectional view taken along a dot-and-dash line A of FIG. 6.
Figure 8:
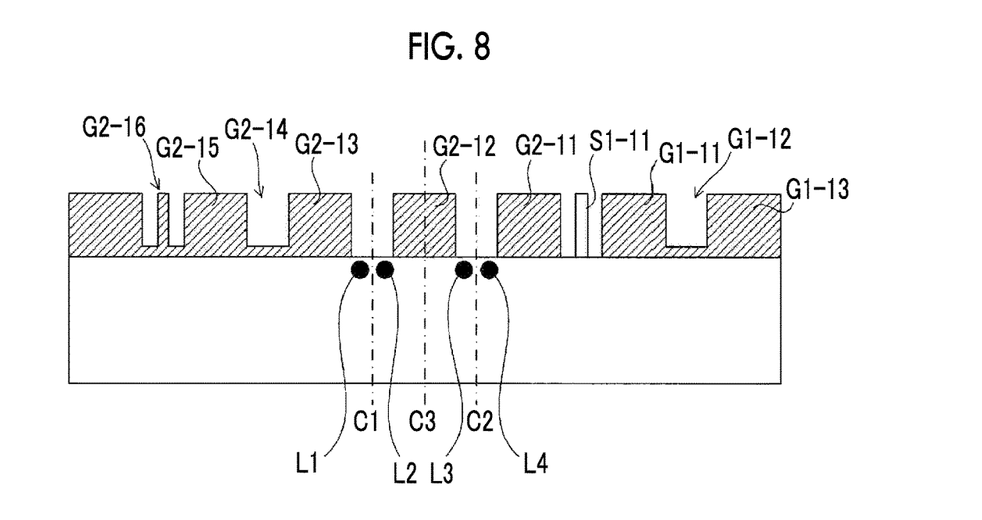
FIG. 8 is a cross-sectional view taken along a dot-and-dash line B of FIG. 6.

FIG. 6 is a second example of the optical modulator according to the present invention, and this example enhances the symmetry focusing on a wider range than that in FIG. 3. Specifically, the lead-out wiring part of the signal electrode S2 has two portions which are parallel to the extended direction of the optical waveguide, and the symmetry of the control electrode is maintained in consideration of all these portions. FIG. 7 is a cross-sectional view taken along a dot-and-dash line A of FIG. 6, and FIG. 8 is a cross-sectional view taken along a dot-and-dash line B of FIG. 6.

In a range in which the interaction part shown in FIG. 7 is present, with regard to the centrosymmetric axis C1, the signal electrode S1-1 is disposed corresponding to the lead-out wiring part S2-2, and a stress relaxation structure G1-2 of the ground electrode is provided corresponding to the lead-out wiring part S2-3. In particular, in the ground electrode G1-2, a protrusion-shaped portion which is put between two slit parts is formed in accordance with the structure of the lead-out wiring part S2-3.

With respect to the centrosymmetric axis C2, a stress relaxation structure G1-4 of the ground electrode is provided corresponding to the lead-out wiring part S2-2. Further, with respect to the centrosymmetric axis C3, the stress relaxation structure G1-2 of the ground electrode is formed corresponding to the lead-out wiring part S2-2 and the stress relaxation structure G1-4 of the ground electrode is configured corresponding to the lead-out wiring part S2-3.

With respect to the symmetry in the control electrode, the symmetry may be set to be higher as it is closer to the optical waveguide. For this reason, in the case of the nested type optical waveguide as shown in FIG. 3 or 6, the symmetry of the centrosymmetric axis of the second Mach-Zehnder type optical waveguide is firstly taken into account, and then the symmetry of the centrosymmetric axis of the first Mach-Zehnder type optical waveguide is taken into account.

FIG. 8 illustrates a range in which the interaction part is not present. However, a stress relaxation structure G2-16 of the ground electrode is configured corresponding to the lead-out wiring part S1-11 in consideration of the centrosymmetric axes C1 and C3.

Figure 9:
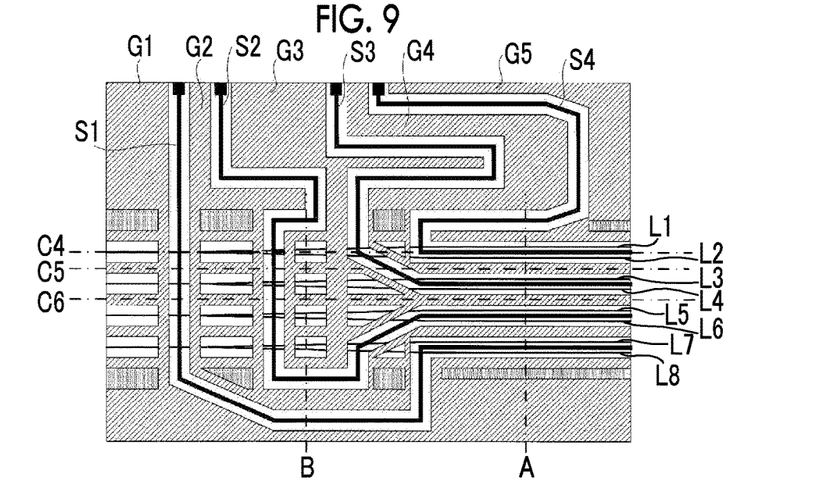
FIG. 9 is a plan view for describing a third example (the vicinity of the input part of the RF modulation electrode) relating to the optical modulator according to the present invention.

FIG. 9 shows an aspect of the vicinity of a RF modulation signal input part of DP-QPSK (Dual Polarization-Quadrature Phase Shift Keying). In the optical waveguides (L1 to L8), a second Mach-Zehnder type optical waveguide is incorporated into each of branching waveguides of a first Mach-Zehnder type optical waveguide and a third Mach-Zehnder type optical waveguide is incorporated into each of branching waveguides of the second Mach-Zehnder type optical waveguide. FIG. 9 shows the respective branching waveguides (L1 to L8) of the third Mach-Zehnder type optical waveguide.

Figure 10:
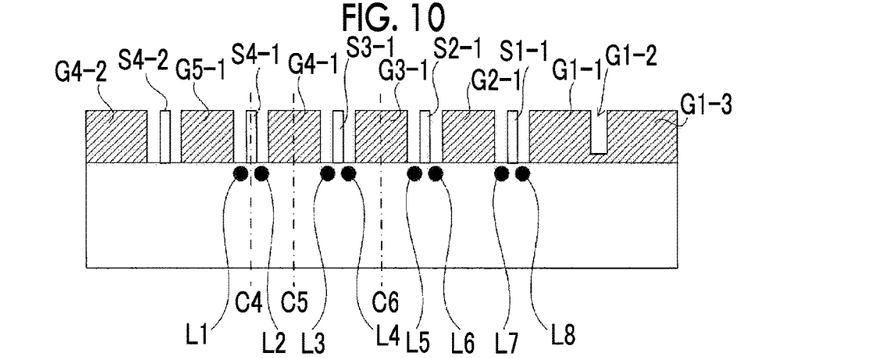
FIG. 10 is a cross-sectional view taken along a dot-and-dash line A of FIG. 9.

FIG. 10 is a cross-sectional view taken along a dot-and-dash line A of FIG. 9 and is a diagram for describing the state of a range in which the interaction part is present. With respect to a centrosymmetric axis C4 of the third Mach-Zehnder type optical waveguide, a signal electrode S3-1 is disposed corresponding to a lead-out wiring part S4-2. Further, with respect to a centrosymmetric axis C5 of the second Mach-Zehnder type optical waveguide, a signal electrode S2-1 is disposed corresponding to the lead-out wiring part S4-2. Further, with respect to a centrosymmetric axis C6 of the first Mach-Zehnder type optical waveguide, a slit part G1-2 is formed corresponding to the lead-out wiring part S4-2. Of course, it goes without saying that it is possible to take into account symmetry with respect to other centrosymmetric axes. The same applies to the following description.

Figure 11:
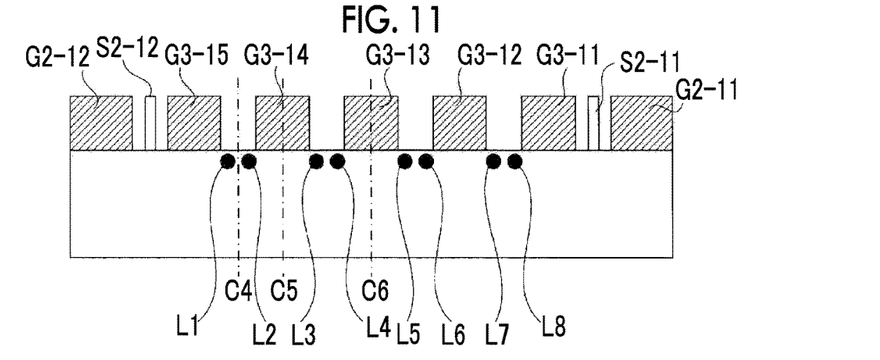
FIG. 11 is a cross-sectional view taken along a dot-and-dash line B of FIG. 9.

FIG. 11 is a cross-sectional view taken along a dot-and-dash line B of FIG. 9 and is a diagram for describing the state of a range in which the interaction part is not present. With respect to the centrosymmetric axis C4, the gap between ground electrodes G3-13 and G3-14 is adjusted corresponding to a lead-out wiring part S2-12. As necessary, it is also possible to adjust the distance including the width of the ground electrode G3-14. Further, with respect to the centrosymmetric axis C5, the gap between ground electrodes G3-12 and G3-13 is adjusted corresponding to the lead-out wiring part S2-12. Further, with respect to the centrosymmetric axis C6, a lead-out wiring part S2-11 is disposed corresponding to the lead-out wiring part S2-12.

Figure 12:
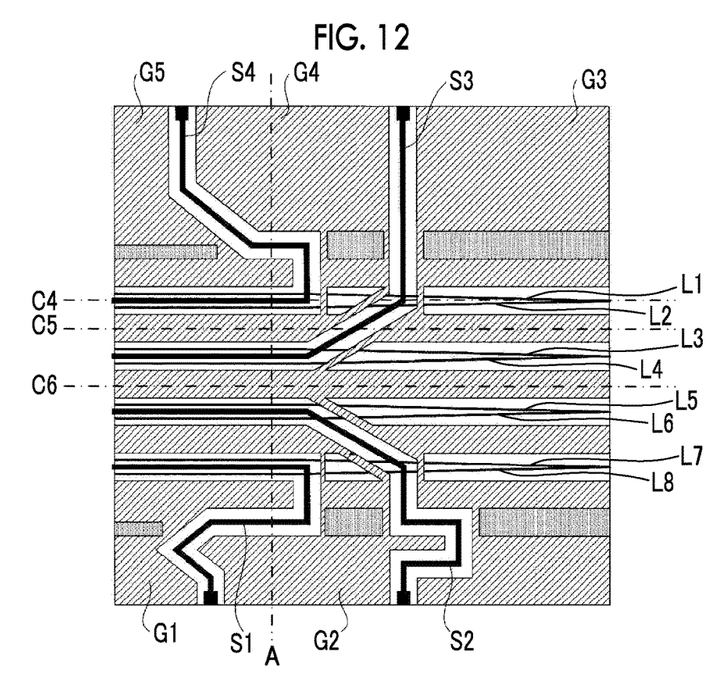
FIG. 12 is a plan view for describing a fourth example (the vicinity of an output part of the RF modulation electrode) relating to the optical modulator according to the present invention.
Figure 13:
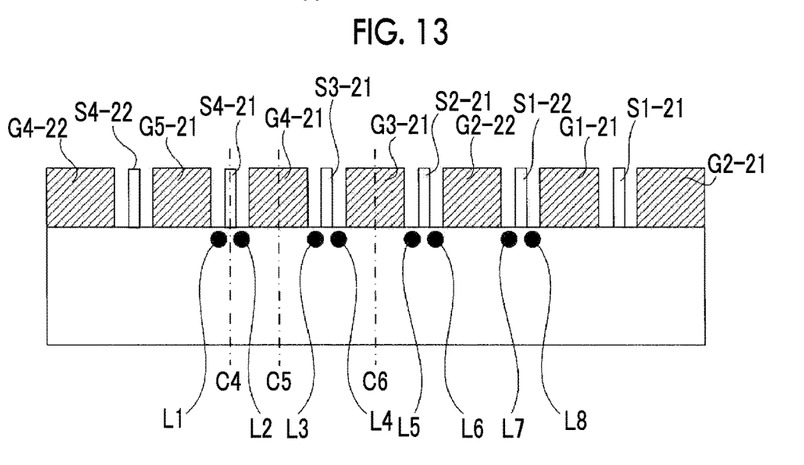
FIG. 13 is a cross-sectional view taken along a dot-and-dash line A of FIG. 12.

FIG. 12 shows an aspect of the vicinity of a RF modulation signal output part of the DP-QPSK. FIG. 13 is a cross-sectional view taken along a dot-and-dash line A of FIG. 12. With respect to the centrosymmetric axis C4, a signal electrode S3-21 is disposed corresponding to a lead-out wiring part S4-22. Further, with respect to the centrosymmetric axis C5, a signal electrode S2-21 is disposed corresponding to the lead-out wiring part S4-22. Further, with respect to the centrosymmetric axis C6, a lead-out wiring part S1-21 of another signal electrode is disposed corresponding to the lead-out wiring part S4-22.

Figure 14:
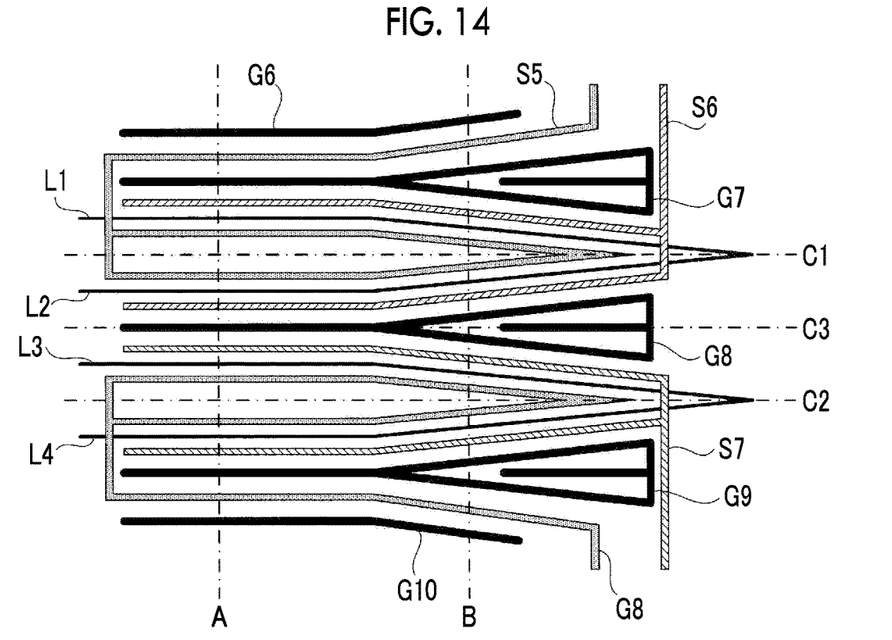
FIG. 14 is a plan view for describing a fifth example (a DC electrode) relating to the optical modulator according to the present invention.
Figure 15:
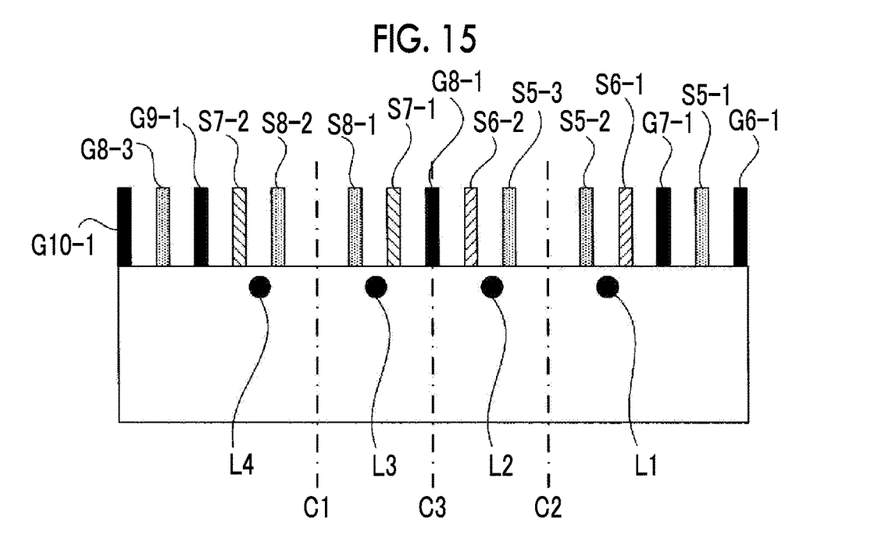
FIG. 15 is a cross-sectional view taken along a dot-and-dash line A of FIG. 14.
Figure 16:
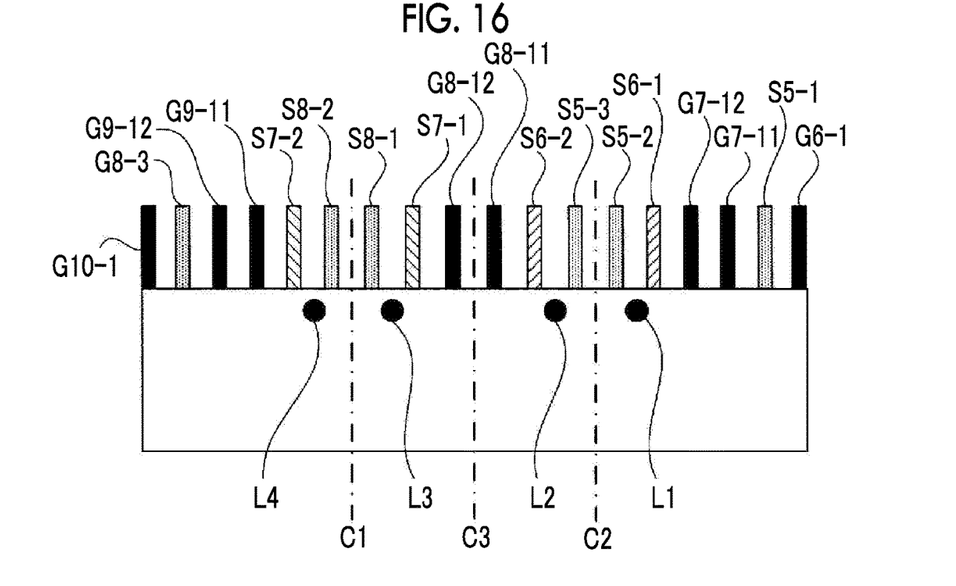
FIG. 16 is a cross-sectional view taken along a dot-and-dash line B of FIG. 14.

FIG. 14 shows DC bias electrodes provided in the nested type optical waveguides (L1 to L4). FIG. 15 is a cross-sectional view taken along a dot-and-dash line A of FIG. 14, and FIG. 16 is a cross-sectional view taken along a dot-and-dash line B of FIG. 14. DC bias is applied between signal electrodes S5 and S6 and between signal electrodes S7 and S8.

With respect to the centrosymmetric axis C1, a signal electrode S7-1 is disposed corresponding to a lead-out wiring part S5-1. Further, with respect to the centrosymmetric axis C3, a lead-out wiring part S8-3 of another signal electrode is disposed corresponding to the lead-out wiring part S5-1.

Figure 17:
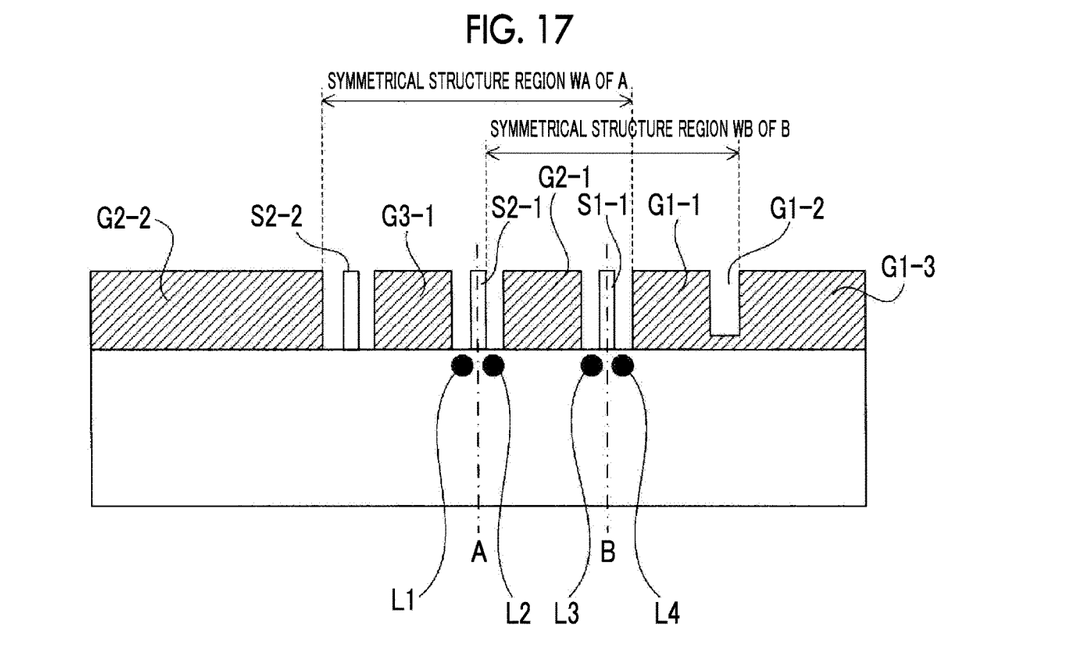
FIG. 17 is a diagram (Part 1) for describing asymmetrical structure region when considering an operating point shift amount when a temperature change is applied.
Figure 18:
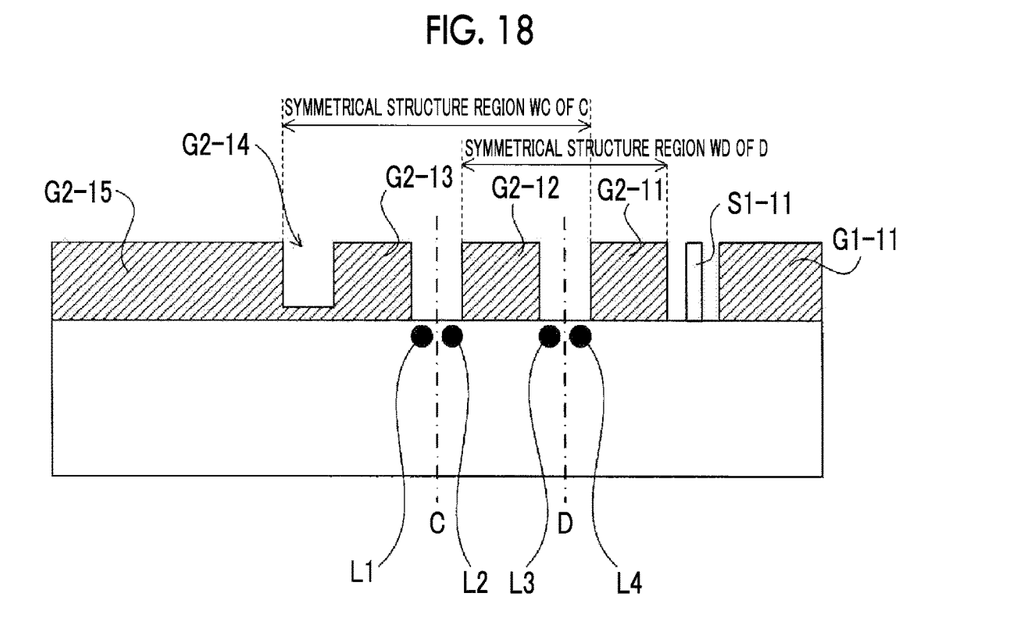
FIG. 18 is a diagram (Part 2) for describing asymmetrical structure region when considering an operating point shift amount when a temperature change is applied.

FIGS. 17 and 18 show the same cross-sectional views as FIGS. 4 and 5. A region for arranging a symmetrical structure on the basis of a centrosymmetric axis A is shown by an arrow WA. Similarly, also with respect to centrosymmetric axes B to D, symmetrical structure regions are shown by WB to WD. Here, in order to confirm a range of a region for which symmetry is required, the operating point shift amount when a temperature change was applied in a range of −5° C. to 75° C., which is an operating temperature range of an optical modulator, was determined by experiments, and the results as shown in FIG. 19 were obtained.

Figure 19:
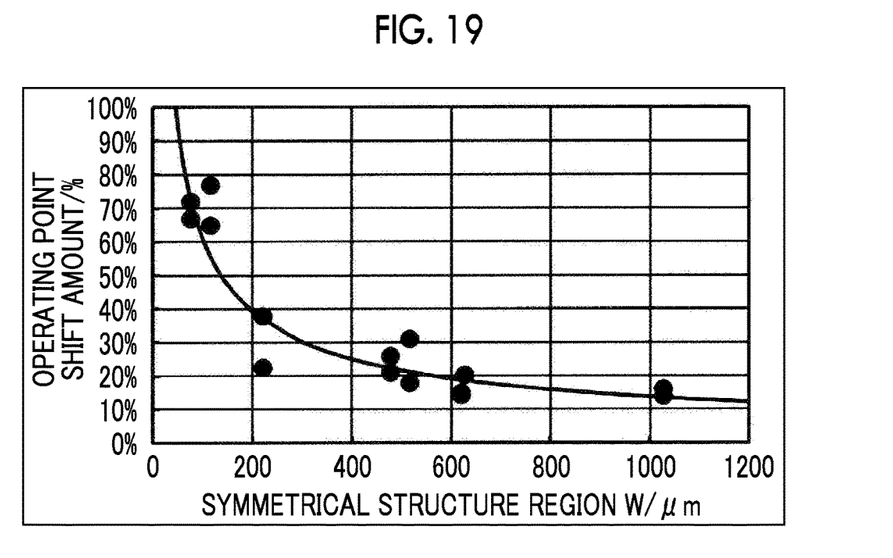
FIG. 19 is a graph showing a change of the operating point shift amount with respect to a range W of the symmetrical structure region.

In FIG. 19, the operating point shift amount with respect to a temperature change was normalized by Vπ. A power approximation was adopted as an approximate curve in the graph. From this result, it is suggested that in order to reduce the operating point shift amount to 50% or less, the symmetrical structure region of 140 µm or more is required. That is, a symmetrical structure needs to be formed to a range 70 µm or more away from the centrosymmetric axis. Further, in order to reduce the operating point shift amount to 20% or less, it is necessary to provide a symmetrical structure to a range of 300 µm or more from the centrosymmetric axis.

In the optical modulator according to an aspect of the present invention, the higher the height of the electrode of the lead-out wiring part is, the more effectively it can be applied. In particular, in a case of having the electrode height of 10 µm or more, it is preferable to apply the present invention. Further, the thinner the thickness of the substrate (the substrate having an electro-optic effect, such as $LiNbO_3$) configuring the optical modulator is, the more strongly the substrate is affected by stress due to the thermal expansion of the control electrode. For example, in a case of using a substrate having a thickness of 100 µm or less, it is particularly preferable to adopt the configuration of the present invention.

INDUSTRIAL APPLICABILITY

As described above, according to the present invention, it is possible to provide an optical modulator in which even in a case where an optical waveguide and a control electrode are highly integrated, a strain due to stress acting on the optical waveguide from lead-out wiring of a signal electrode is relaxed and occurrence of a temperature drift or the like is suppressed.

REFERENCE SIGNS LIST

1: substrate
S1 to S8: signal electrode
G1 to G10: ground electrode
C1 to C6: centrosymmetric axis in an extended direction of a Mach-Zehnder type optical waveguide
L1 to L8: optical waveguide (branching waveguide)
R1: range in which an interaction part on which attention is focused is existed
R2: range in which a branching waveguide on which attention is focused is existed

The invention claimed is:
1. An optical modulator comprising: a substrate having an electro-optic effect;
   an optical waveguide which is formed on the substrate and provided with at least one Mach-Zehnder type optical waveguide; and
   a control electrode which controls light waves propagating through the optical waveguide,
   wherein the control electrode is configured of a signal electrode and a ground electrode, the signal electrode being provided with a pad part for input or output, which is electrically connected to an electric circuit which is provided outside the substrate, an interaction part which applies an electric field to the optical waveguide, and a lead-out wiring part which connects the pad part and the interaction part to each other, a portion of the lead-out wiring part is disposed parallel to an extended direction of the Mach-Zehnder type optical waveguide within an area of the interaction part, and a stress relaxation structure of the ground electrode having a slit part is formed at a position which is axially symmetrical to the portion of the lead-out wiring part with respect to a centrosymmetric axis in the extended direction of the Mach-Zehnder type optical waveguide.

2. The optical modulator according to claim 1, wherein a range in which a structure of the control electrode is symmetrical with respect to the centrosymmetric axis is a range of 70 µm or more from the centrosymmetric axis.

3. The optical modulator according to claim 1, wherein in the optical waveguide, a second Mach-Zehnder type optical waveguide is formed in each of two branching waveguides of a first Mach-Zehnder type optical waveguide, and any one of a portion of the interaction part, another portion of the lead-out wiring part, and a stress relaxation structure of the ground electrode is formed at a position which is axially symmetrical to the portion of the lead-out wiring part with respect to either or both of a centrosymmetric axis in an extended direction of the first Mach-Zehnder type optical waveguide and a centrosymmetric axis in an extended direction of the second Mach-Zehnder type optical waveguide.

4. The optical modulator according to claim 1, wherein in the optical waveguide, a second Mach-Zehnder type optical waveguide is formed in each of two branching waveguides of a first Mach-Zehnder type optical waveguide, a third Mach-Zehnder type optical waveguide is formed in each of two branching waveguides of each second Mach-Zehnder type optical waveguide, and any one of a portion of the interaction part, another portion of the lead-out wiring part, and a stress relaxation structure of the ground electrode is formed at a position which is axially symmetrical to the portion of the lead-out wiring part with respect to any one or all of a centrosymmetric axis in an extended direction of the first Mach-Zehnder type optical waveguide, a centrosymmetric axis in an extended direction of the second Mach-Zehnder type optical waveguide, and a centrosymmetric axis in an extended direction of the third Mach-Zehnder type optical waveguide.

5. The optical modulator according to claim 1, wherein a portion of the lead-out wiring part is disposed parallel to an extended direction of the Mach-Zehnder type optical waveguide within a range in which two branching waveguides configuring the Mach-Zehnder type optical waveguide are present in the extended direction and in an area outside of the interaction part, and another portion of the lead-out wiring part or a stress relaxation structure of the ground electrode having a slit part is formed at a position which is axially symmetrical to the portion of the lead-out wiring part with respect to a centrosymmetric axis in the extended direction of the Mach-Zehnder type optical waveguide.

* * * * *